(12) United States Patent
Windebank

(10) Patent No.: US 6,246,819 B1
(45) Date of Patent: Jun. 12, 2001

(54) FIBER OPTIC CLADDING DISPLACEMENT CONNECTOR

(75) Inventor: Robert W. Windebank, Waterbury, CT (US)

(73) Assignee: PRC Inc., McLean, VA (US)

( * ) Notice: Subject to any disclaimer, the term of this patent is extended or adjusted under 35 U.S.C. 154(b) by 0 days.

(21) Appl. No.: 09/209,774

(22) Filed: Dec. 11, 1998

(51) Int. Cl.$^7$ ...................................................... G02B 6/26
(52) U.S. Cl. ................................................ 385/48; 385/39
(58) Field of Search ........................................ 385/48, 39

(56) References Cited

U.S. PATENT DOCUMENTS

| | | |
|---|---|---|
| 3,936,631 | 2/1976 | Muska . |
| 3,982,123 | 9/1976 | Goell et al. . |
| 4,103,154 * | 7/1978 | D'Auria et al. ...................... 250/227 |
| 4,549,782 | 10/1985 | Miller . |
| 4,696,534 | 9/1987 | Saha . |
| 4,696,535 | 9/1987 | Saha . |
| 4,741,584 | 5/1988 | Segerson . |
| 4,784,452 * | 11/1988 | Hodge et al. ...................... 350/96.15 |
| 4,792,202 | 12/1988 | Zucker et al. . |
| 4,802,723 | 2/1989 | Miller . |
| 4,822,125 | 4/1989 | Beals et al. . |
| 4,856,864 | 8/1989 | Campbell et al. . |
| 4,881,789 | 11/1989 | Levinson . |
| 4,887,880 | 12/1989 | Levinson . |
| 5,029,962 | 7/1991 | Uken et al. . |
| 5,037,170 | 8/1991 | Uken et al. . |
| 5,039,188 | 8/1991 | Williams . |
| 5,163,105 | 11/1992 | Knoll et al. . |
| 5,189,298 | 2/1993 | Lieber . |
| 5,235,657 | 8/1993 | Tardy . |
| 5,315,675 | 5/1994 | Dennis et al. . |
| 5,390,271 | 2/1995 | Priest . |

* cited by examiner

Primary Examiner—Frank G. Font
Assistant Examiner—Layla Lauchman
(74) Attorney, Agent, or Firm—Lowe Hauptman Gilman & Berner, LLP

(57) ABSTRACT

Disclosed is an optical fiber displacement connector and method used with a fiber optic cable as an optical tap. The fiber optic cable includes a light carrying center, a cladding and a buffer. The cladding displacement connector has surfaces which can be used for displacing the buffer and cladding to expose the light carrying center. The cladding displacement connector at least partially surrounds the light carrying center of the fiber optic cable. The cladding displacement connectors are formed of an optically conductive material and is insertable into a printed circuit board or an integrated circuit chip. The connector can carry bi-directional and multi-wavelength light signals. The optical signal carried by the light carrying center of the fiber optic cable can be caused to exit the fiber optic cable by displacing the cladding, abrading the cladding, dissolving the cladding, and carving a groove into the light carrying center. The connector is then placed in optical contact with the light carrying center of the optical cable. The connector can also be used with an optical fiber.

29 Claims, 2 Drawing Sheets

FIBER OPTIC CLADDING DISPLACEMENT CONNECTOR

FIELD OF THE INVENTION

The present invention relates generally to optic fiber connectors, and more particularly, to a fiber optic displacement connector used for displacing an outer cover on an optical fiber and/or for tapping an optical signal from an optical fiber.

BACKGROUND OF THE INVENTION

Optical fiber connectors have been used to tap optical signals from optical fibers. Such optical fiber connectors can be used to tap the optical signals from the optical fiber along intermediate points thereof. The optical fiber connector can also be used to terminate the optical fiber. In either arrangement, the optical signals are carried by the optical fiber connector from the optical fiber into an optical device such as a light detecting diode or photo transistor which would then generate an electrical signal based on the tapped optical signal.

One such conventional optical fiber connector is disclosed in U.S. Pat. No. 3,936,631. An arrangement is disclosed for tapping signal power from an optical fiber waveguide without requiring that the fiber be terminated or broken. An intermediate length of an optical cable (fiber waveguide) from which all or most of the outer cladding has been removed is sandwiched between first and second dielectric bodies. The first optical body is circular and is formed of a relatively compliant dielectric material, such as a soft plastic. The second body is formed of a relatively hard dielectric material such as glass or hard plastic. The two dielectric bodies, and an exposed portion where the cladding has been removed, are placed in a specially designed holder and forced together so that the fiber deforms the first body providing a large area of contact therewith. A photodetector disposed adjacent to the first body detects the power coupled out of the fiber, converting it to a representative electrical signal.

One disadvantage of the disclosed arrangement is the relative complexity of requiring various separate parts to be assembled together to tap the optical signal from the optical fiber.

SUMMARY OF THE INVENTION

It is, therefore, an object of the present invention to provide a fiber optic displacement connector usable for removing an outer cover from a fiber optic cable.

It is another object of the present invention to provide a one piece fiber optic connector.

It is yet a further object of the present invention to provide a fiber optic connector and method for displacing the buffer and cladding of an optical cable to tap the optical signal from the optical fiber.

It is yet another object of the present invention to provide a fiber optic connector that can be optically coupled to a light carrying center of fiber optic cable or an optical fiber without damaging the light carrying center or optical fiber.

These and other objects of the present invention are achieved by an optical fiber displacement connector and method used with a fiber optic cable as an optical tap. The fiber optic cable includes a light carrying center, a cladding and a buffer. The cladding displacement connector has surfaces which can be used for displacing the buffer and cladding to expose the light carrying center. The cladding displacement connector at least partially surrounds the light carrying center of the fiber optic cable. The cladding displacement connector is formed of an optically conductive material and is insertable into a printed circuit board or an integrated circuit chip. The connector can carry bidirectional and multi-wavelength light signals. The optical signal carried by the light carrying center of the fiber optic cable can be caused to exit the optical fiber by displacing the cladding, abrading the cladding, dissolving the cladding, and carving a groove into the light carrying center. The cladding displacement connector can then be placed adjacent to the light carrying center.

The foregoing objects of the present invention are also achieved by an optical fiber tap for optically connecting to an optical cable. The optical cable has a light carrying center and an outer cover. The optical fiber tap includes a body having a recess for receiving a portion of the light carrying center. The body has a first displacement portion and a second displacement portion, each said first displacement portion and said second displacement portion having a displacement surface at an end thereof for displacing the outer cover of the optical cable. The body has at least one surface for optical communication with the light carrying center.

The foregoing objects of the present invention are also achieved by an optical fiber tap for optically connecting to an optical cable. The optical cable has a light carrying center and an outer cover. The optical fiber tap includes a body having a recess for receiving a portion of the light carrying center. The body has a first displacement portion and a second displacement portion. Each of the first displacement portion and the second displacement portion has a displacement surface at an end thereof for displacing the outer cover of the optical cable. The body has at least one surface for optical communication with the light carrying center. The displacement surfaces have a first angled surface and a second angled surface. The recess has a first inner surface and a second inner surface. The first angled surface and the first inner surface form a first edge. The second angled surface and the second inner surface form a second edge. The first and second edges form cutting edges for displacing the outer cover.

The foregoing objects of the present invention are also achieved by an optical fiber tap for optically connecting to an optical fiber. The optical fiber tap includes a body having a recess for receiving a portion of the optical fiber. The body has a first leg and a second leg, at least one of which is positionable against the optical fiber.

The foregoing objects of the present invention are also achieved by a method of tapping an optical signal from a fiber optic cable having a light carrying center surrounded by an outer cover. The light carrying center is exposed using a fiber optic connector. The fiber optic connector is abutted against the light carrying center.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

BEST MODE FOR CARRYING OUT THE INVENTION

Figure 1:
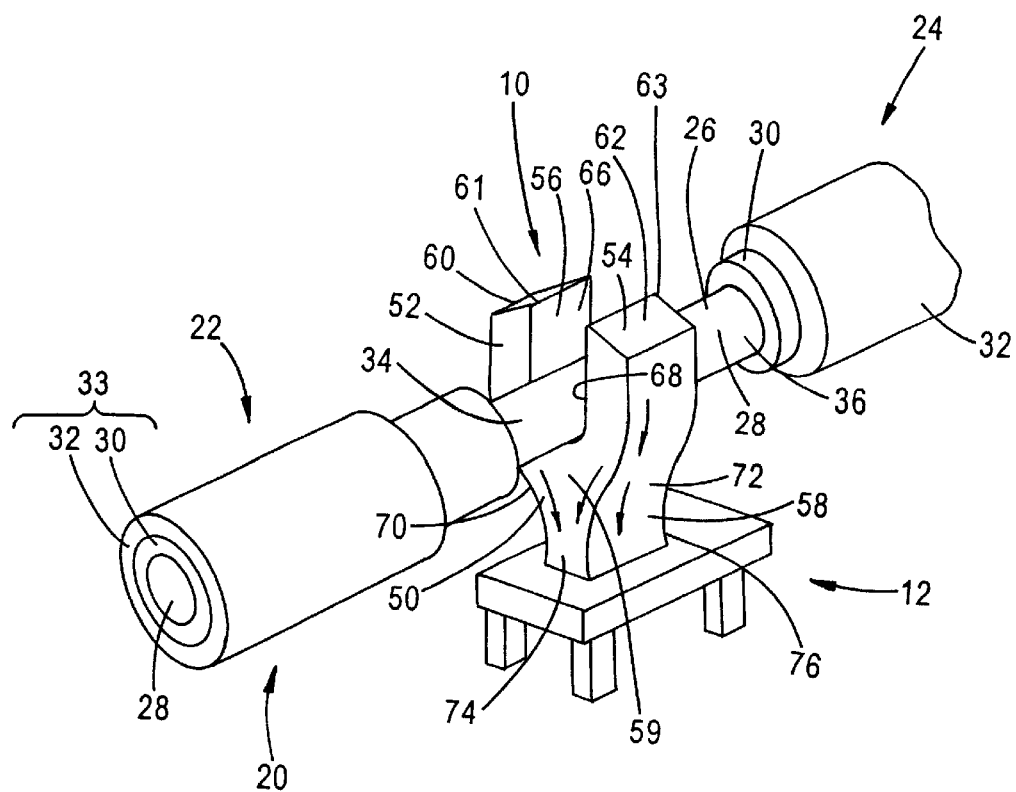
FIG. 1 is a perspective view of the fiber optic displacement connector according to the present invention optically coupled to an exposed portion of a fiber optic cable and to an integrated circuit chip.

Referring first to FIG. 1, there is illustrated a fiber optic displacement 10 connector constructed in accordance with the principles of the present invention. For convenience, terms such as "left", "right", "above" and "below" are to be construed in the relative sense. The present application is related to co-pending patent application entitled "OPTICAL FIBER TAP" and assigned to the instant assignee and filed on even date herewith and is hereby incorporated by reference into this specification in its entirety.

As depicted in FIG. 1, the fiber optic displacement connector 10 according to the present invention is mounted between a printed circuit board 12 and a fiber optic cable 20 and connects a printed circuit board or integrated circuit chip 12 to a fiber optic cable 20. The fiber optic cable 20 includes a left portion 22, a right portion 24 connected by a center portion 26. The fiber optic cable 20 includes a light carrying center 28 surrounded by a cladding 30 and a buffer 32. The cladding 30 and the buffer 32 together form an outer cover 33. The center portion 26 as depicted in FIG. 1, includes an exposed portion 34 having an outside diameter 36. The exposed portion 34 exposes the light carrying center 28. As used herein, an optical fiber has only the light carrying center or optical core without any cladding or buffer. The fiber optic displacement connector 10 can also be used with an optical fiber.

Figure 2:
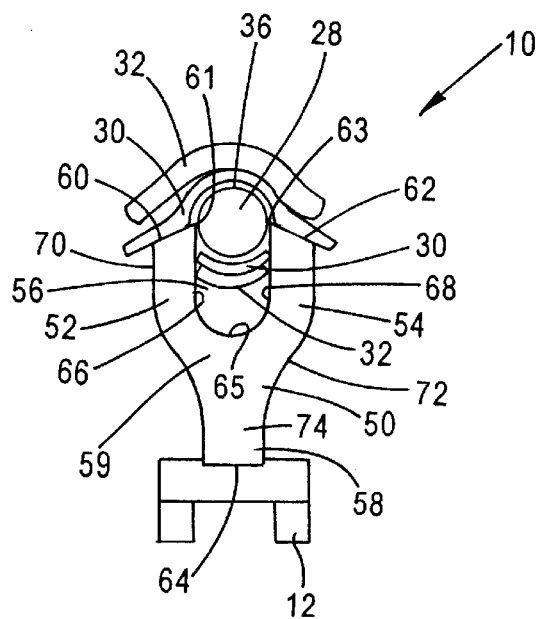
FIG. 2 is a side elevational view, partially in section, depicting the fiber optic displacement connector displacing the cladding and buffer of the fiber optic cable.

The light carrying center 28 is preferably plastic but can be glass or any other conventional optical material. As depicted in FIGS. 1 and 2, the fiber optic connector 10 of the present invention includes a body 50 having a first leg 52 and a second leg 54 separated by a U-shaped recess 56. The body 50 is of one piece construction and is made from an optically conductive material and is preferably of plastic coated glass or of plastic coated plastic. The first leg 52 and the second leg 54 join together at the bottom of the U-shaped recess 56 forming a connecting leg 58. A center portion 59 is located at the intersection of the first leg 52, the second leg 54 and the connecting leg 58. The first leg 52 has a first angled surface 60 at a distal end thereof. The second leg 54 has a second angled surface 62 at a distal end thereof. The first angled surface 60 and the second angled surface 62 extend from a distal end of U-shaped recess 56 in a direction towards a connecting surface 64 which is located at a distal end of connecting leg 58. The U-shaped recess is deeper than the outer diameter 36 of the light carrying center 28. As depicted in FIG. 1, connecting surface 64 is connected to printed circuit board 12 in a conventional manner.

As depicted in FIG. 2, a curved surface 65 is located at the bottom of U-shaped recess 56 and connects an inner surface 66 of the first leg 52 to an inner surface 68 of the second leg 54. Inner surface 66 and inner surface 68 are substantially parallel to each other and the curved surface 65 is shaped to conform to the outer diameter 36 of the light carrying center 28. The surfaces 66 and 68 are spaced apart in a manner to have a slight compression on the outside diameter 36 to make good optical contact therewith. An outer surface 70 extends between an edge of angled surface 60 and extends to an edge of the connecting surface 64. An outer surface 72 extends between an edge of the second angled surface 62 and the connecting surface 64. The body 50 of the fiber optic displacement connector 10 has a flat front surface 74 and a spaced flat rear surface 76.

The fiber optic connector 10 is depicted in FIG. 2 displacing the outer cover 33 including cladding 30 and buffer 32. The angled surfaces 60, 62 are used to push the outer cover 33 to expose the outside diameter 36 of the light carrying center 28. The fiber optic displacement connector 10 is pushed onto the fiber optic cable 20 at any point along the fiber optic cable 20 until the cladding 30 and buffer 32 are displaced and the outside diameter 36 of the light carrying center 28 is in optical contact with the inner surfaces 66 and 68 of the fiber optic displacement connector 10. As the fiber optic displacement connector 10 is pushed into the fiber optic cable 20, the angled surfaces 60, 62 are brought into contact with the outer diameter of the outer cover 33. The angled surfaces 60, 62 intersect the inner surfaces 66, 68, respectively, and form a pair of sharp edges 61, 63. The sharp edges 61, 63 will displace or tear the outer cover 33 so that the outside diameter 36 is exposed when the fiber optic displacement connector is fully pushed onto the fiber optic cable 20. A portion of the outer cover 33 may remain located between the outer diameter 36 and the surface 65 after the fiber optic displacement connector 10 is pushed onto the fiber optic cable 20. It is preferable to subsequently remove this portion because this portion will reduce the quantity of light being carried by the fiber optic displacement connector 10.

Figure 3:
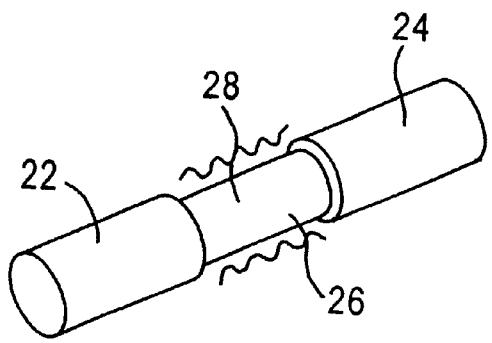
FIG. 3 is a perspective view of an abrasion process used to remove the outer cover of the fiber optical cable.

The light carrying center 28 of fiber optic cable 20 can also be exposed by abrading away the cladding 30 and buffer 32 as depicted in FIG. 3. This fiber optic displacement connector 10 can then be positioned adjacent to the light carrying center 28.

Figure 4:
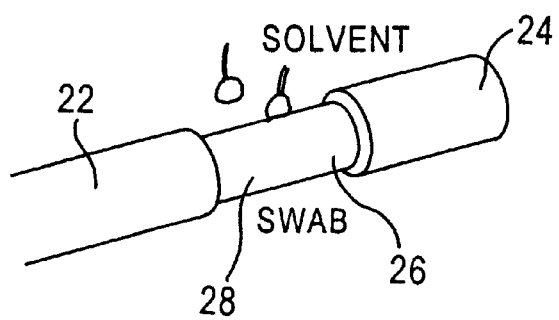
FIG. 4 is a perspective view of a solvent process used to expose the light carrying center using a solvent.

As depicted in FIG. 4, the cladding 30 and buffer 32 can be removed to expose the light carrying center 28 of fiber optic cable 20 by using a solvent which dissolves the outer cover 33 without affecting the light carrying center 28.

Figure 5:
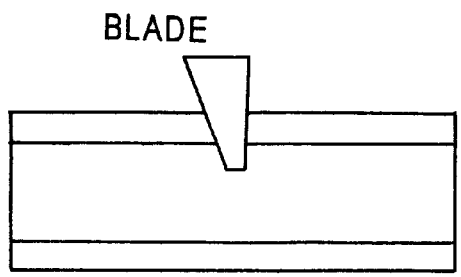
FIG. 5 is a side elevational view in section illustrating a blade being inserted through the outer cover into the light carrying center of the fiber optic cable for directing optical signals carried by the light carrying center in a transverse direction.

Another method of exposing light carrying center is to use a blade to cut through the outer cover 33 and form a groove in the light carrying center 28 as depicted in FIG. 5. An example of cutting a groove into an optical fiber is disclosed in U.S. Pat. No. 4,549,782, issued Oct. 29, 1985, entitled "ACTIVE OPTICAL FIBER TAP", the disclosure of which is hereby incorporated by reference into this specification in its entirety. After the fiber optic cable 20, is cut, the fiber optic displacement connector 10 can then be positioned adjacent to the light carrying center 28.

In any of the disclosed embodiments, light carried by light carrying center 28 can be tapped and some of the light energy directed into the fiber optic displacement connector 10 and carried to printed circuit board 12 by the fiber optic displacement connector 10. Light can also be directed from the printed circuit board 12 into surface 64 of the fiber optic connector 10 and carried by the connector 10 into the light carrying center 28. The printed circuit board 12 can be a motherboard, backplane, and daughter card among other known devices. The fiber optic displacement connector 10 interconnects fast pulse, analog and digital signals between data processing modules. One or more fiber optic displacement connectors 10 can be used to tap the light carrying center 28 and direct the signals to various devices.

The fiber optic cable 20 can be large or small plastic, flexible or rigid, and can carry light signals of any wavelength. Alternatively, instead of using a fiber optic cable, a single or multi-fiber ribbon can also be used. The light carrying center can carry bi-directional and multi-wavelength signals. The present invention is also usable with fiber ribbon with an array of optical receivers and transmitters.

An alternative embodiment would include a single connector having two opposed U-shaped recesses for connecting to fiber optic cables. The printed circuit board 12 can include optical transmitting or receiving devices.

The connecting surface 64 can also be connected to an optical device or a light detecting diode instead of the printed circuit board 12.

Another advantage of the fiber optic displacement connector 10 is the connector 10 can be permanently or temporarily optically connected to an optical fiber or light carrying center of a fiber optic cable with damaging the optical fiber or light carrying center.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. An optical fiber tap for optically connecting to an optical cable, the optical cable having a light carrying center and an outer cover, said optical fiber tap comprising:

a body having a recess for receiving a portion of said light carrying center;

said body having a first displacement portion and a second displacement portion, each said first displacement portion and said second displacement portion having a displacement surface at an end thereof for displacing the outer cover of the optical cable;

said body having at least one surface for optical communication with said light carrying center.

2. The optical fiber tap of claim 1, wherein said body is made from one of plastic coated glass and plastic coated plastic.

3. The optical fiber tap of claim 1, wherein said recess has a U-shape.

4. The optical fiber tap of claim 1, wherein said first displacement portion and said second displacement each have angled surfaces which extend outwardly from said recess.

5. The optical fiber tap of claim 1, wherein imaginary lines extending from said angled surfaces intersect and form an angle of less than 180°.

6. The optical fiber tap of claim 1, wherein said displacement surfaces are angled surfaces.

7. The optical fiber tap of claim 1, wherein said displacement surfaces have a first angled surface and a second angled surface and said recess has a first inner surface and a second inner surface, said first angled surface and said first inner surface forming a first edge, and said second angled surface and said second inner surface forming a second edge, said first and second edges forming a cutting edge for displacing said outer cover.

8. The optical fiber of claim 1, wherein each of said first displacement portion and said second displacement portion has an angled surface and wherein a portion of each of said angled surfaces closest to said recess initially contacts said outer cover of said optical fiber when said optical fiber tap is brought into contact with said optical fiber.

9. The optical fiber of claim 1, wherein the outer cover includes a buffer and a cladding concentrically surrounding the light carrying center.

10. The optical fiber of claim 1, wherein said optical fiber tap is made from an optically conductive material.

11. The optical fiber tap of claim 1, wherein said first displacement portion has an inner surface and said second displacement portion has an inner surface, said inner surfaces are spaced apart approximately the same distance as a diameter of said light carrying center.

12. The optical fiber tap of claim 1, wherein said recess is sized to receive the light carrying center, and at least one of said inner surfaces can be brought into optical contact with said light carrying center.

13. The optical fiber tap of claim 1, wherein the optical fiber tap is one piece.

14. The optical fiber tap of claim 1, wherein the optical fiber tap can displace the outer cover without damaging the light carrying center.

15. An optical fiber tap for optically connecting to an optical cable, the optical cable having a light carrying center and an outer cover, said optical fiber tap comprising:

a body having a recess for receiving a portion of said light carrying center;

said body having a first displacement portion and a second displacement portion, each said first displacement portion and said second displacement portion having a displacement surface at an end thereof for displacing the outer cover of the optical cable;

said body having at least one surface for optical communication with said light carrying center;

said displacement surfaces have a first angled surface and a second angled surface and said recess has a first inner surface and a second inner surface, said first angled surface and said first inner surface forming a first edge, and said second angled surface and said second inner surface forming a second edge, said first and second edges forming cutting edges for displacing said outer cover.

16. The optical fiber tap of claim 15, wherein said body is made from one of plastic coated glass and plastic coated plastic.

17. The optical fiber tap of claim 15, wherein said displacement surfaces have a first angled surface and a second angled surface and said recess has a first inner surface and a second inner surface, said first angled surface and said first inner surface forming a first edge, and said second angled surface and said second inner surface forming a second edge, said first and second edges forming a cutting edge for displacing said outer cover.

18. The optical fiber of claim 15, wherein a portion of each of said angled surfaces closest to said recess initially contacts said outer cover of said optical fiber when said optical fiber tap is brought into contact with said optical fiber.

19. The optical fiber of claim 15, wherein the outer cover includes a buffer and a cladding concentrically surrounding the light carrying center.

20. The optical fiber of claim 15, wherein said optical fiber tap is made from an optically conductive material.

21. The optical fiber tap of claim 15, wherein said first displacement portion has an inner surface and said second displacement portion has an inner surface, said inner surfaces are spaced apart approximately the same distance as a diameter of said light carrying center.

22. An optical fiber tap for optically connecting to an optical fiber, said optical fiber tap comprising:

an integrally formed body having a recess for receiving a portion of the optical fiber;

said body having a first leg and a second leg, at least one of which is positionable against the optical fiber.

23. A method of tapping an optical signal from a fiber optic cable having a light carrying center surrounded by an outer cover, the method comprising:

exposing the light carrying center using a fiber optic connector having a first displacement portion and a second displacement portion, each of the first displacement portion and the second displacement portion having a displacement surface at an end thereof for displacing the outer cover of the fiber optic cable; and abutting the fiber optic connector against the light carrying center.

24. The method of claim 23, comprising displacing the outer cover using angled surfaces of the fiber optic connector.

25. The method of claim 24, further comprising cutting the outer cover.

26. The method of claim 23, wherein the fiber optic connector has angled surfaces at a distal end of a recess and the angled surfaces of the fiber optic connector are pushed into the outer cover thereby displacing the outer cover and further positioning a recess of the fiber optic connector to partially surround the light carrying center.

27. The method of claim 23, wherein said exposing step includes abrading the outer cover.

28. The method of claim 23, wherein said exposing step includes dissolving the outer cover.

29. The method of claim 23, wherein said exposing step includes carrying a groove into the light carrying center.

* * * * *

UNITED STATES PATENT AND TRADEMARK OFFICE
CERTIFICATE OF CORRECTION

PATENT NO. : 6,246,819 B1
DATED : Juen 12, 2001
INVENTOR(S) : Robert W. Winderbank Page 1 of 1

It is certified that error appears in the above-identified patent and that said Letters Patent is hereby corrected as shown below:

Title page,
Item [73], Assignee: LITTON SYSTEMS, INC. WATERTOWN CONNECTICUT

Signed and Sealed this

Twelfth Day of March, 2002

Attest:

JAMES E. ROGAN
*Director of the United States Patent and Trademark Office*

*Attesting Officer*